United States Patent [19]

Pujari

[11] Patent Number: 4,518,335

[45] Date of Patent: May 21, 1985

[54] DILATANT MOLD AND DILATANT MOLDING APPARATUS

[75] Inventor: Vimal K. Pujari, Columbia, Md.

[73] Assignee: Allied Corporation, New York, N.Y.

[21] Appl. No.: 589,906

[22] Filed: Mar. 14, 1984

[51] Int. Cl.³ .......................... B29C 1/00; B29C 1/16; B29D 31/02

[52] U.S. Cl. ................................. 425/78; 425/405 R; 425/421; 425/584

[58] Field of Search .................. 425/78, 421, 412, 456, 425/405 R, 584

[56] References Cited

U.S. PATENT DOCUMENTS

| | | | |
|---|---|---|---|
| 1,995,947 | 3/1935 | Seil | 425/421 |
| 2,452,382 | 10/1948 | Long | 425/405 |
| 2,586,148 | 2/1952 | Clark et al. | 425/465 |
| 3,302,262 | 2/1967 | Chanlund | 425/421 |
| 3,712,785 | 1/1973 | Hirt et al. | 425/421 |
| 3,734,658 | 5/1973 | Livera | 425/78 |
| 3,743,468 | 9/1973 | Helmrich | 425/421 |
| 3,756,762 | 9/1973 | Maugweiler | 425/421 |
| 3,804,570 | 4/1974 | Hösehle et al. | 425/78 |
| 3,901,642 | 8/1975 | Urmanov et al. | 425/410 |

*Primary Examiner*—Willard E. Hoag
*Attorney, Agent, or Firm*—James R. Ignatowski; Russel C. Wells

[57] ABSTRACT

An apparatus for molding complex powder articles having a two part dilatant mold resiliently coupled. The two halves of the mold are resiliently pressed into physical contact with each other by external means. A vacuum pump connected to the mold produces a fluidized powder material flow from a powder feed mechanism into the mold cavity. A vibrator vibrates the mold during the filling of the mold cavity with powdered material with a force sufficient to slightly separate the two halves of the mold cyclically dilating the volume of the mold cavity. The dilation of the mold cavity in combination with the fluidized powder feed permits the mold cavity to be uniformly filled with powder material. Dilation of the mold cavity also compacts the powder material received in the mold.

22 Claims, 7 Drawing Figures

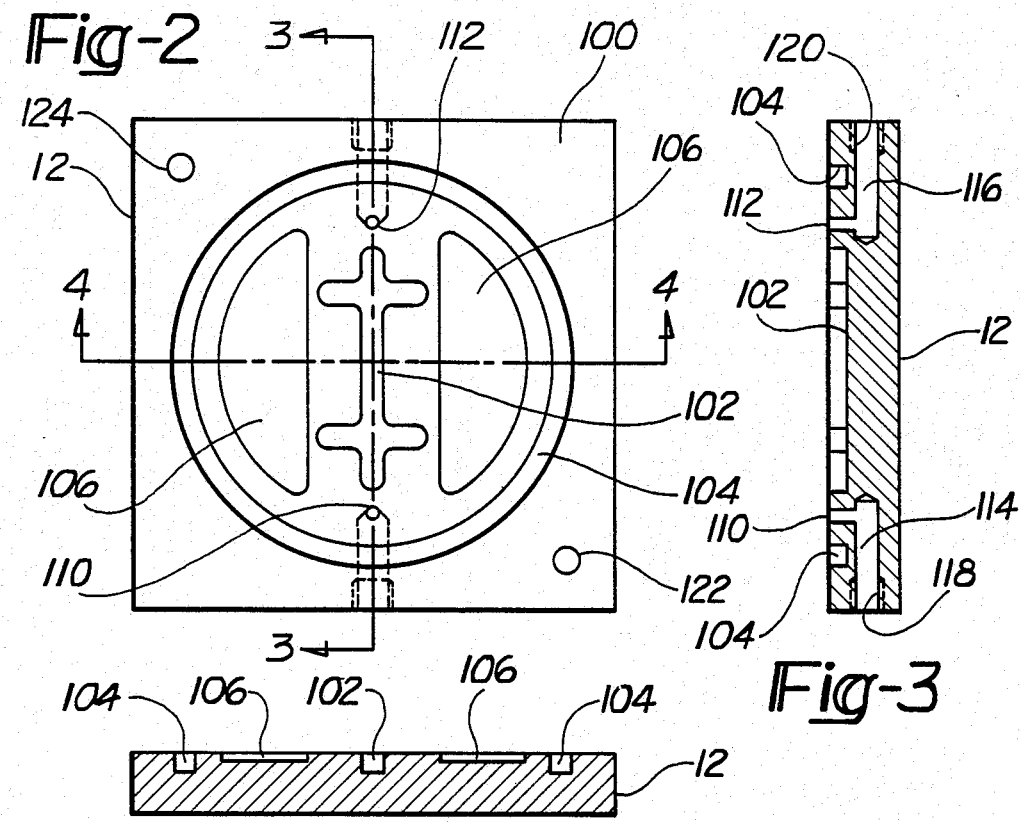
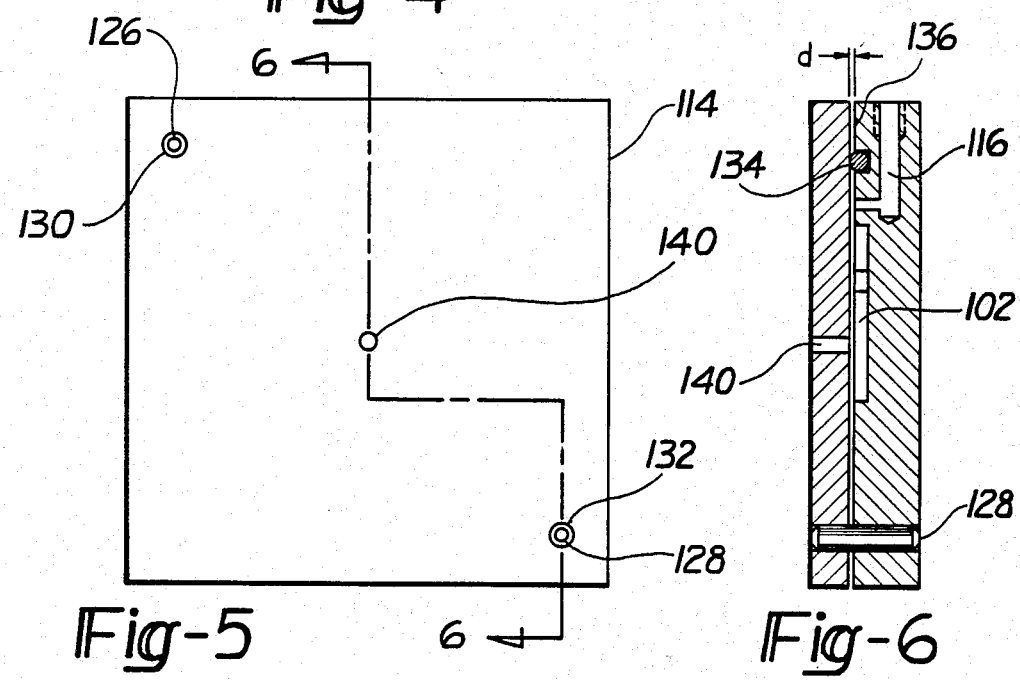

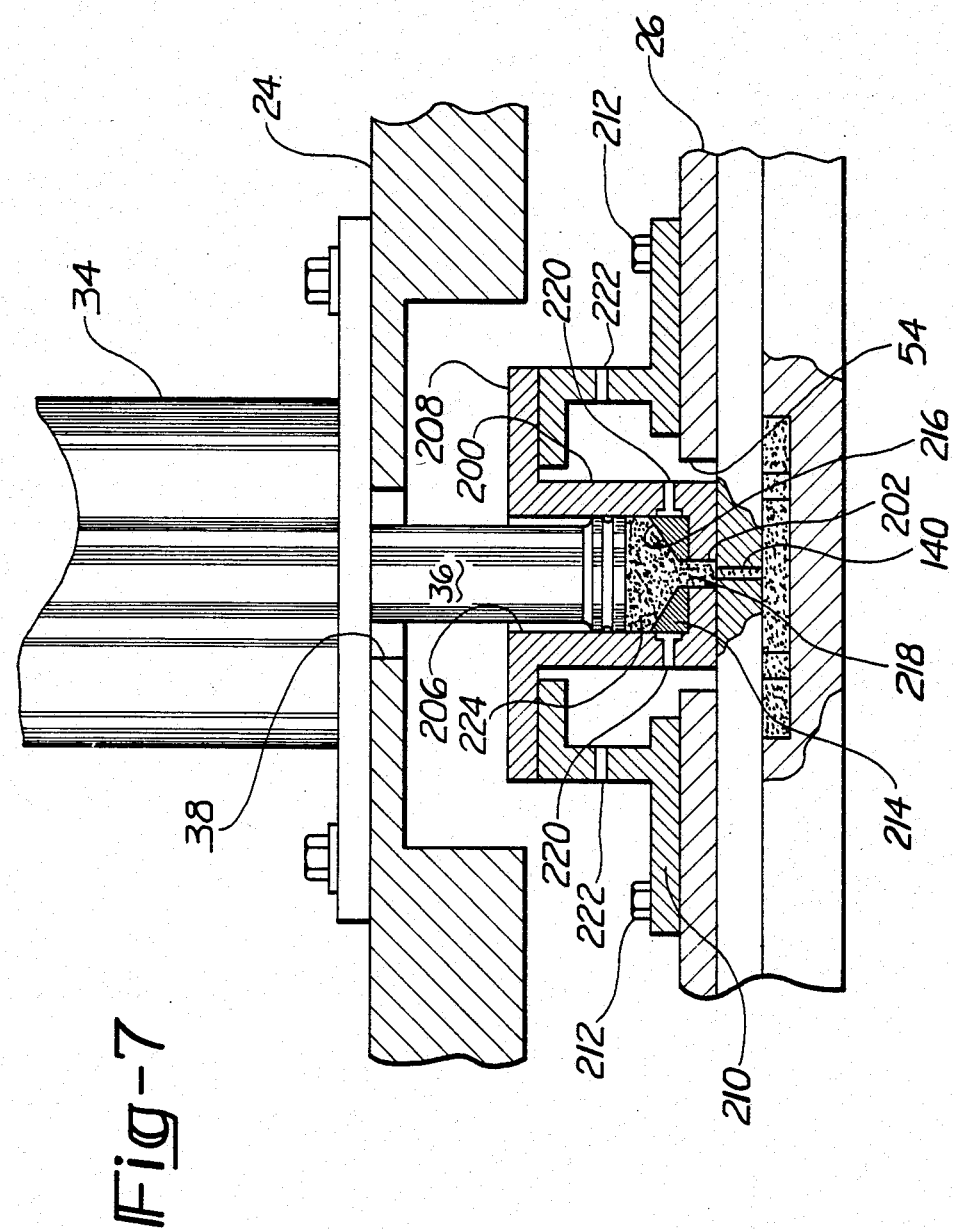

DILATANT MOLD AND DILATANT MOLDING APPARATUS

BACKGROUND OF THE INVENTION

1. Cross Reference

This application is related to application Ser. No. 589,905 filed concurrently herewith which also describes the dilatant mold apparatus and fluidized powder feed disclosed herein.

2. Field of the Invention

The invention is related to molds used in metal and ceramic powder forming and in particular to a mold and molding aparatus producing a dilatant motion which assists in the filling of the mold.

3. Prior Art

The use of metal powder forming for making relatively small intricate metal parts is finding acceptance in industry as more economical than die casting. As the formed parts become more complex, difficulties are being encountered in filling the molds with powdered material. To overcome these problems Helmrick et al, U.S. Pat. No. 3,743,468, and Chanlund, in U.S. Pat. No. 3,302,262, teach longitudinal vibration of the mold while applying pressure to the powdered material. Seil, in U.S. Pat. No. 1,995,947, further suggests transverse vibration of the mold. To further assist the distribution of the powdered material within the mold, Hirt et al, in U.S. Pat. No. 3,712,785, adds the concept of evacuating the mold to remove gas particles from between the interstices of the powdered material. In a different approach Maugweiler, U.S. Pat. No. 3,756,762, teaches a compacting apparatus for carbon rods in which the cover and bottom half of the mold are vibrated at different frequencies. However all of these approaches have only been successful with the molding of parts having relatively simple geometries but are unsatisfactory for the molding of parts with complex geometries.

The present invention is a dilatant mold and molding apparatus which is compatable with the molding of parts with both simple and complex geometries.

SUMMARY OF THE INVENTION

The invention is a powder molding apparatus of the type having a mold with a mold cavity corresponding to shape of the part to be molded, a fill aperture for filling the mold cavity with powdered material, at least one exhaust port connected to said mold cavity, a pedestal for resiliently supporting the mold, vibrator means for vibrating said dilatant mold, powder feed means for transmitting powdered material to the mold cavity through said fill aperture, and means attached to said at least one exhaust port for evacuating the air from said mold cavity, the improvement characterized by said mold having a top half and a bottom half, a fill aperture, an internal mold cavity connected to said fill aperture, at least one exhaust port adjacent to said mold cavity, an annular seal recess between said first half and second half circumscribing said mold cavity and said at least one exhaust port, a resilient seal disposed in said annular seal recess having a cross-sectional diameter larger than the depth of said annular seal recess, means for maintaining the translational registration of the top and bottom halves of the mold, and compressive means cooperating with said pedestal means for producing a force resiliently compressing the top and bottom halves of the mold into physical contact against the force of said resilient seal; and vibrator means producing a force sufficient to cause said top and bottom halves of the mold to periodically separate a small distance against the force of said compressive means dilating the volume of said mold cavity.

One advantage of the molding apparatus is that the dilation of the mold enhances the filling and uniform distribution of the powdered material in the mold cavity. Another advantage is that the dilation of the mold compacts the powdered material in the mold cavity increasing the density of the formed part. These and other advantages of the invention will become more apparent from a reading of the detailed description in conjunction with the appended drawings.

BRIEF DESCRIPTION OF THE DRAWINGS

FIG. 2 is a top view of the bottom half of the dilatant mold.

FIG. 3 is a cross-sectional side view of the bottom half of the mold.

FIG. 4 is a cross-sectional side view of the bottom half of the mold rotated 90° with respect to FIG. 3.

FIG. 5 is a top view of the top half of the mold.

FIG. 6 is a cross-sectional side view of the mold assembly before compression.

FIG. 7 is a cross section of the fluidized powder feed.

DETAILED DESCRIPTION OF THE INVENTION

Figure 1:
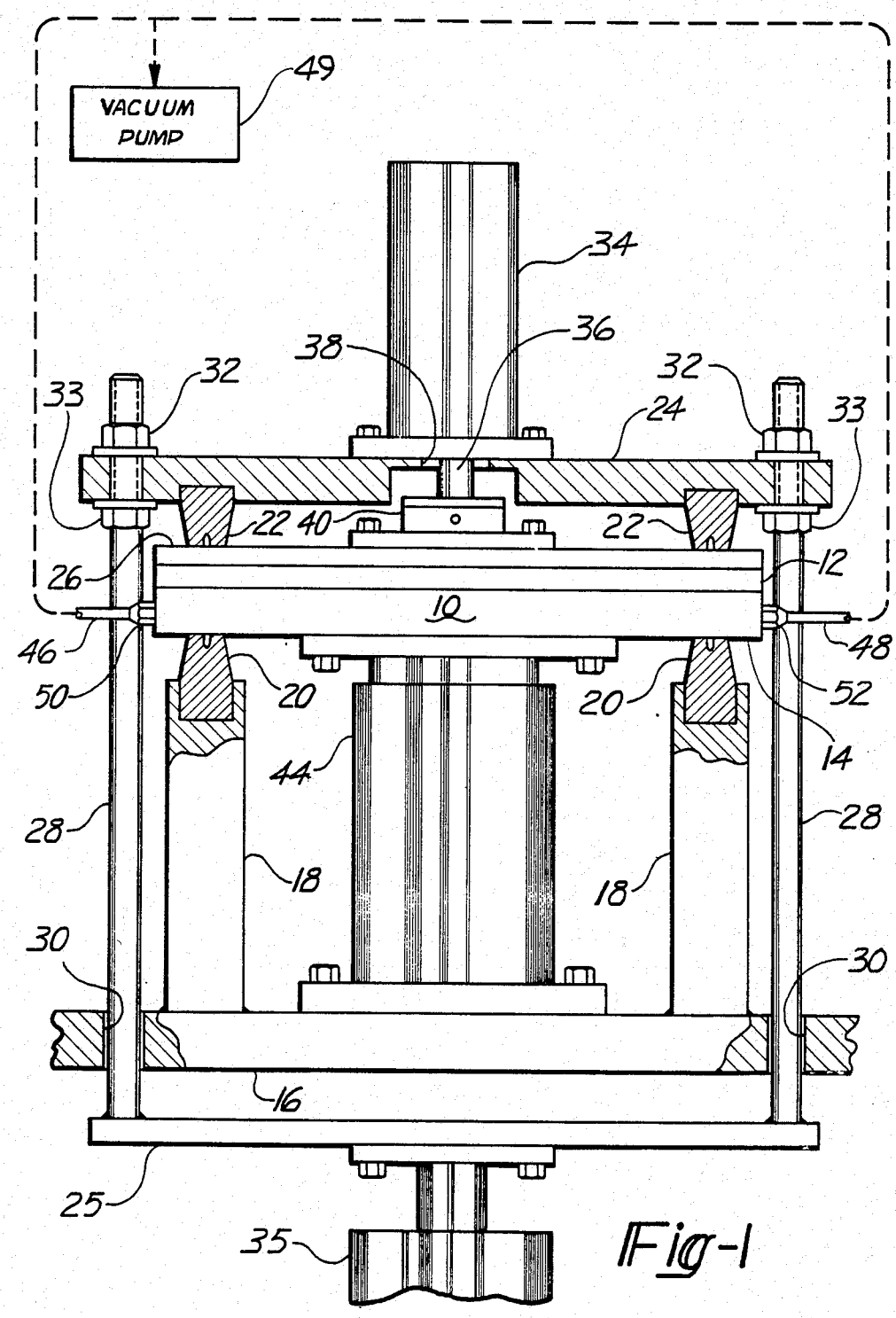
FIG. 1 is a frontal view of the powder molding apparatus.

The apparatus for vibratory powder forming using a dilatant mold is illustrated in FIG. 1. The dilatant mold 10 comprising a top half 12 and a bottom half 14 is mounted for vibration from a base plate 16. Attached to the base plate 16 are a plurality of upright pedestals 18, each having a vibration isolator 20 attached to the end opposite the base plate. The vibration isolators 20 may be trunkated rubber members captivated in a recess at the ends of the pedestals as shown or may be any other type of commercially available vibration isolator or shock mount known in the art. The other end of the vibration isolators 20 engage and support the bottom half 14 of the dilatant mold 10 substantially parallel to the base plate 16.

A second plurality of vibration isolators 22 are disposed between a top platten 24 and a feed support plate 26 fixedly attached to the top half 12 of the dilatant mold 10. The top platten 24 is held in position above the dilatant mold 10 by a plurality of stress rods 28. One end of each stress rod 28 is attached to top platten 24 between opposing nuts 32 and 33 as shown while the opposite ends are attached to a bottom platten 25 through mating apertures 30 in the base plate 16. A compressive force urging the top half 12 of the dilatant mold 10 against the bottom half 14 is achieved by a pneumatic cylinder 35 attached to bottom platten 25 below the base plate 16.

A pneumatic cylinder 34 attached to the top platten 24 has a piston 36 passing through an appropriate aperture 38 in the top platten 24 exerting a downward force on powdered material contained in a fluidized powder feed 40 attached to the top surface of the feed support plate 26.

A vibrator 44 is attached between the base plate 16 the lower surface of the bottom half 12 of dilatant mold 10. The vibrator 44 may comprise a single vibrator, as shown, vibrating the bottom half of dilatant mold in the vertical plane. Alternatively, more than one vibrator may be attached to the bottom half 12 of the dilatant mold simultaneously vibrating the bottom half 12 along different axes, such as two or three different mutually perpendicular axes. However it is understood the vibrational axes need not be mutually perpendicular and may be disposed at different angles relative to each other.

A pair of vacuum feed lines 46 and 48 are connected to the bottom half of mold 10 by a pair of vacuum connectors 50 and 52. The vacuum lines 46 and 48 interconnect the interior of mold 10 with a vacuum pump 49 through a pair of vacuum ports 110 and 112 in the bottom half of mold 10 as shall be explained with reference to FIGS. 2 and 3 hereinafter.

The details of the dilatant mold shall be discussed relative to FIGS. 2 through 5. Referring first to FIGS. 2 through 4, there is shown a plan view and two mutually perpendicular cross-sectional side views of the bottom half 12 of the dilatant mold. The bottom half 12 of the mold has a generally rectangular shape with a flat interface surface 100 and a centrally diposed mold cavity 102 corresponding to the shape of the part to be molded. The mold cavity 102 is circumscribed by a circular recess 104 adapted to receive a resilient circular sealing ring such as an "O" ring 134 shown in FIG. 6.

Shallow recesses, such as recess 106 are provided in the space between the mold cavity 102 and circular recess 104 to capture any powder that may spill out of the molded cavity 102 during dilatant vibration of the top and bottom halves of the mold. Vacuum ports, such as vacuum ports 110 and 112 are provided through the flat interface surface intermediate the mold cavity 102 and circular recess 104. The vacuum ports 110 and 112 are interconnected with vacuum channels 114 and 116 respectively. The vacuum channels 114 and 116 respectively exit the sides of the bottom half 12 and have threaded portions 118 and 120 respectively for receiving vacuum line connectors such as vacuum line connectors 50 and 52 shown on FIG. 1. Connectors 50 and 52 may include filters as is known in the art, to prevent powdered material from being sucked into the vacuum pump 49. A pair of dowel pin holes 122 and 124 are provided through the bottom half 12 adjacent to opposite corners as shown for receiving dowel pins 126 and 128 as shown in FIGS. 5 and 6.

Referring now to FIGS. 5 and 6 there is shown a plan view and cross-sectional side view of the dilatant mold 10 and the details of the top half 14. The top half 14 has a generally rectangular shape with a flat interface surface 136 mating with interface surface 100 of the bottom half 12 and at least one centrally disposed fill aperture 140 through which the mold cavity 102 is filled with powder. The top half 14 also has a pair of dowel pin apertures 130 and 132 adapted to receive dowel pins 126 and 128 with a slip fit permitting the top half 114 of the mold to move vertically with respect to the bottom half 12 during vibration while maintaining registration between the fill aperture 140 with the mold cavity 102. A resilient circular seal, such as "O" ring 134 is disposed in circular recess 104 and forms a vacuum seal about the mold cavity 102 and vacuum ports 110 and 112. The cross-sectional diameter of the "O" ring is selected to be larger than the depth of circular recess 104 so that in an uncompressed state, as shown in FIG. 6, the top and bottom halves of the mold are separated by a small distance "d". When assembled on the pedestal, the "O" ring 134 is compressed by activating pneumatic cylinder to lower top platten 24 to form a good vacuum seal when the interface surfaces 100 and 136 are abutting or in close proximity to each other. This permits the top and bottom halves 12 and 14 to separate a small distance during the vibration of the mold 10 without losing the vacuum in the mold cavity 102.

The details of the fluidized powder feed 40 are shown on FIG. 7. The top plate 26 has a clearance aperture 54 circumscribing the fill aperture 140. A cylindrical feed cup 200, having an axially exit port 202 provided in the bottom thereof, is disposed in said clearance aperture 54 with the exit port 202 concentric with the fill aperture 140 formed through the top half 12 of the mold 10. The feed cup 200 has an internal bore 204 receiving the piston 36 of the pneumatic cylinder 34 with a sliding fit. A stabilizer flange 208 extends radially from the top of the feed cup 200 and abuts the top surface of a support collar 210 fixedly attached to the top plate using fasteners such as screws 212.

A porous annulus 214 having a mesh size between 3 to 10 microns is disposed at the bottom of feed cup 200. The porous annulus 214 has an internal conical surface 216 sloping downwardly from its periphery towards a central aperture 218 concentric with the exit aperture 202 of the feed cup. A plurality of vent apertures 220 are provided through the walls of the feed cup 200 adjacent to the porous annulus 214. The vent apertures 220 provide for an air flow through the porous annulus 214 into the mold cavity 102 when the pressure in the mold cavity 102 is reduced by the vacuum pump. In a like manner the support collar 210 has one or more vent apertures 222 providing for a free atmospheric pressure air flow into the space between the feed cup 200 and the support collar.

The resilience of pneumatic piston 36 permit limited vertical movement of the mold 10 during vibration while maintaining the physical contact between the bottom of the feed cup 200 with the top surface of mold 10. The piston 36 restrains lateral movement of the feed cup 200. Therefore, lateral movement of the mold during vibration will result in the bottom of the feed cup sliding laterally across the top surface of the mold 10.

Alternatively, a pressurized gas or air source may be connected directly to the vent apertures 220 to increase the gas flow through the porous annulus 214. To insure powder feed during vibration, the diameter of the exit port 202 of the feed cup 200 is larger than the diameter of fill aperture 140 permitting limited lateral movement between the feed cup 200 and the mold 10. The stabilizer flange 208, engaging the top surface of the support collar 210 maintains the feed cup 200 in a vertical position preventing the feed cup from cocking and binding the piston in internal bore 206.

The operation of the dilatant mold is as follows: The feed cup 200 is loaded with a quantity of powdered material 224 in excess of the quantity required to fill the mold cavity 102 in the dilatant mold 10. The pneumatic cylinder 34 is then activated to insert the piston 36 into the feed cup producing a predetermined force on the top surface of the powdered material urging the powdered materials towards the mold 10. The vibrator 44 is then activated to vibrate the dilatant mold and a vacuum from vacuum pump 49 is then applied to the vacuum ports 118 and 120 via vacuum lines 46 and 48 creating a reduced pressure in dilatant mold 10 inside the "O" ring seal 134. As the dilatant mold is vibrated, the powdered material in the feed cup 200 is urged to flow through the exit aperture 218 of the feed cup 200 and into the mold cavity 102 through feed aperture 140. The reduced pressure in the mold cavity 102 causes an air flow through the apertures 222 in the feed cup and porous annulus 214 fluidizing the powdered material adjacent to the conical surface 216 of the porous annulus 214 towards and through the exit and feed apertures 218 and 140 respectively into mold cavity 102. The fluidized flow in combination with the vibration of the dilatant mold 10 facilitates the filling of the mold cavity 102 and reduces the probability of the powdered material caking up or conglomorating at the exit aperture of the feed cup 200 which would otherwise inhibit the powder from flowing into the mold cavity 102. One advantage of the fluidized feed 40 is that the powdered material is fluidized adjacent to the exit aperture of the feed cup 200 enhancing its flow characteristics. Another advantage is that the fluidizing air flow is in a direction towards the mold cavity assisting the force of the pneumatic cylinder's piston 36 in transporting the powdered material.

During the vibration of the dilatant mold 10 inertial forces overcome the resilient forces provided by the vibration isolators holding the top and bottom halves of the dilatant mold together permitting the two halves of the dilatant mold to periodically separate a small distance causing a dilation of the mold cavity 102. This dilation of the mold cavity 102 causes the powder bed formed in mold cavity to shear and assists in distributing the powdered material uniformly throughout the mold cavity 102. The dilatant action of the two halves of the dilatant mold 10 also results in a semicompacted state of the powder material in the mold cavity. The ultimate packing of the powder as it flows inside the mold is accomplished by vibrating the mold at a predetermined frequency and acceleration. The use of multimodal powder mixtures in combination with the dilatant mold apparatus further enhances the packing density of the article being molded.

The air flow through the mold 10 from the fluidized feed 40 to the vacuum ports 110 and 112 sweeps the powdered material from between the interface surfaces 100 and 136 inside the resilient seal 134 permitting the interface surfaces to come into intimate contact with each other. The powder material swept from between the interface surfaces 100 and 136 is collected in the shallow recesses 106. Alternatively, the "O" ring surrounding the mold cavity 102 may be omitted. In this case the resiliency, and hence the dilation between the two halves of the mold 10, is provided by the vibration isolators 20 and 22. Without the "O" ring, the air flow at the parting line of the two halves of mold 10 is towards the evacuated mold cavity 102. This forms an air screen around the mold cavity 102 preventing powder leakage into the parting line.

It is intended that the invention not be limited to the specific configurations of the pedestal and dilatant mold shown in the drawings and discussed in the Specification. It is recognized that those skilled in the art may make changes to the physical configurations of these components without departing from the spirit of the invention as set forth in the appended claims.

I claim:

1. A molding apparatus for forming a powder preform having the shape of a desired part comprising a mold having a fill aperture, an internal mold cavity corresponding to the shape of the part to be formed connected to said fill aperture, and at least one exhaust port connected to said mold cavity, a pedestal for resiliently supporting said mold, vibrator means for vibrating said mold, powder feed means for transmitting powdered material to said mold cavity through said fill aperture, and means attached to said at least one exhaust port for evacuating the air from said mold cavity, the improvement characterized by:
    a dilatant molding having a top half and a mating bottom half, a fill aperture, an internal mold cavity connected to said fill aperture formed between said top half and bottom half, at least one exhaust port adjacent to said mold cavity, an annular seal recess between said top half and said bottom half circumscribing said internal molding cavity and said at least one exhaust port, and a resilient seal disposed in said annular seal recess resiliently separating said top and bottom halves of the mold; the mold halves being separable by vibration
    compressive mean cooperating with the pedestal for producing a force urging the top and bottom halves of said dilatant mold into physical contact compressing said resilient seal in said seal recess; and
    vibrator means for vibrating said dilatant mold with a force sufficient to cyclically separate said top and bottom halves of the mold a small distance against the force of said compressive means dilating the volume of said internal mold cavity.

2. The apparatus of claim 1 wherein said dilatant mold has at least two dowel pins for inhibiting lateral and rotational translation between the top and bottom halves of the dilatant mold during vibration.

3. The apparatus of claim 1 wherein said powder feed means provides a fluidized powder material flow into the mold cavity.

4. The apparatus of claim 3 wherein the means for evacuating said mold cavity is a vacuum pump connected to said at least one exhaust port, said vacuum pump reducing the internal pressure in said mold cavity causing a gaseous flow through said at least one vent aperture and said porous annulus, said gaseous flow fluidizing the flow of powdered material adjacent to the internal conical surface of said porous annulus through said outlet and fill apertures into said mold cavity.

5. The apparatus of claim 1 wherein said fill aperture is provided in said top half of the dilatant mold and said mold cavity is provided in said bottom half.

6. The apparatus of claim 5 wherein said exhaust port and said annular seal recess are provided in the bottom half of said dilatant mold.

7. The apparatus of claim 6 wherein said dilatant mold further includes at least one shallow recess provided in said bottom half intermediate said mold cavity and said annular seal recess.

8. The apparatus of claim 7 wherein said at least one exhaust port is two exhaust ports and said at least one shallow recess is at least two shallow recesses disposed on opposite sides of said mold cavity.

9. An apparatus for vibratory powder forming comprising:
    a dilatant mold having a top half, a bottom half and a resilient seal therebetween, said dilatant mold having at least one fill aperture, a mold cavity having a shape corresponding to the part to be molded connected to said at least one fill aperture, at least one exhaust port, and an annular seal recess circumscribing said mold cavity and said at least one exhaust port and partially captivating said resilient seal; the mold halves being separable by vibration
    pedestal means for resiliently supporting said dilatant mold for vibration, said pedestal means including vibration insulator means disposed on opposite sides of said dilatant mold for resiliently compressing the top and bottom halves of said dilatant mold into physical contact with each other against the force of said resilient seal;

vibrator means for vibrating said dilatant mold with a force sufficient to cause the top and bottom halves of said dilatant mold to periodically separate a small distance dilating the volume of said mold cavity;

powder feed means for feeding powdered material into said mold cavity through said fill aperture; and means attached to said at least one exhaust port for producing a gaseous flow through said powder feed means and said dilatant mold.

10. The apparatus of claim 9 wherein said dilatant mold further includes at least two dowel pins for inhibiting lateral and rotational translation between the top and bottom halves of the dilatant mold during vibration.

11. The apparatus of claim 9 wherein said powder feed means provides a fluidized powdered material flow into said mold cavity.

12. The apparatus of claim 11 wherein said means for producing a gaseous fluid flow through said powder feed means and said dilatant mold is a vacuum pump connected to said at least one exhaust port, said vacuum pump reducing the internal pressure in said mold cavity causing a gaseous flow through said at least one vent aperture, said porous annulus and said exit and fill apertures, said gas flow fluidizing the flow of powdered material adjacent to the internal conical surface of said porous annulus towards and through said outlet and fill apertures into said mold cavity.

13. The apparatus of claim 9 wherein said fill aperture is provided in said top half of the dilatant mold and said mold cavity is provided in said bottom half.

14. The apparatus of claim 13 wherein said exhaust port and said annular seal recess are provided in the bottom half of said dilatant mold.

15. The apparatus of claim 14 wherein said dilatant mold further includes at least one shallow recess provided in said bottom half intermediate said mold cavity and said annular seal recess.

16. The apparatus of claim 15 wherein said at least one exhaust port is two exhaust ports and said at least one shallow recess is at least two shallow recesses disposed on opposite sides of said mold cavity.

17. A dilatant mold for powder forming comprising:
a top mold half having a fill aperture;
a bottom mold half having a mold cavity having a shape corresponding to the part to be molded, and at least one exhaust aperture adjacent to said mold cavity; the mold halves being separable by vibration means for inhibiting a rotational and lateral translation between said top mold half and the bottom mold half;

support means for resiliently holding said top and bottom mold halves together with a predetermined force;

feed means for supply powdered material to said mold cavity through said fill aperture; and vibrator means attached to one of said top and bottom mold halves for producing a vibratory force sufficient to cause said top and bottom mold halves to cyclically separate a small distance against said predetermined force dilating the volume of said mold cavity.

18. The dilatant mold of claim 17 wherein said bottom mold half has at least one shallow recess provided adjacent to said mold cavity.

19. The dilatant mold of claim 17 wherein said feed means provides a fluidized powdered material flow into said mold cavity.

20. The dilatant mold of claim 17 wherein said means for inhibiting rotational and lateral translation are a pair of spatially separated dowel pins disposed external to said annular seal recess.

21. The dilatant mold of claim 17 further including a resilient seal disposed between said top and bottom mold halves, said resilient seal circumscribing said mold cavity and said at least one exhaust aperture.

22. The dilatant mold of claim 21 wherein said bottom mold half has an annular seal recess for retaining said resilient seal.

* * * * *